US012785558B2

(12) United States Patent
Childs

(10) Patent No.: US 12,785,558 B2
(45) Date of Patent: Nov. 3, 2026

(54) FAST DIGITAL CONTROL FOR A VOLTAGE CONVERTER

(71) Applicant: Renesas Design (UK) Limited, Bourne End (GB)

(72) Inventor: Mark Jonathan Childs, Lydiard Millicent (GB)

(73) Assignee: Renesas Design (UK) Limited, Bourne End (GB)

( * ) Notice: Subject to any disclaimer, the term of this patent is extended or adjusted under 35 U.S.C. 154(b) by 349 days.

(21) Appl. No.: 18/396,016

(22) Filed: Dec. 26, 2023

(65) Prior Publication Data

US 2025/0211084 A1 Jun. 26, 2025

(51) Int. Cl.
*H02M 3/157* (2006.01)
*H02M 1/00* (2007.01)
*H02M 3/156* (2006.01)

(52) U.S. Cl.
CPC ......... *H02M 3/157* (2013.01); *H02M 1/0025* (2021.05); *H02M 3/1566* (2021.05)

(58) Field of Classification Search
CPC ............. H02M 1/0012; H02M 1/0025; H02M 3/1566; H02M 3/157
See application file for complete search history.

(56) References Cited

U.S. PATENT DOCUMENTS

2004/0095112 A1* 5/2004 Kernahan ........... H02M 1/0845 323/282
2007/0085720 A1* 4/2007 Fosler ............... H02M 3/33592 341/155
2009/0079401 A1* 3/2009 Mok ..................... H02M 3/157 323/234
2014/0333270 A1* 11/2014 Young ....................... G05F 1/12 323/234

* cited by examiner

*Primary Examiner* — Fred E Finch, III
(74) *Attorney, Agent, or Firm* — SCULLY, SCOTT, MURPHY & PRESSER, P.C.

(57) ABSTRACT

A voltage converter configured to provide an output voltage, the voltage converter comprising: a first device, configured to measure an absolute voltage with respect to a reference voltage; and a second device, configured measure a relative voltage with respect to the absolute voltage; such that the output voltage is regulated using the measurements of the absolute voltage and the relative voltage.

17 Claims, 7 Drawing Sheets

210

220

610

620

FAST DIGITAL CONTROL FOR A VOLTAGE CONVERTER

The present disclosure relates to a fast digital control for a voltage converter. In particular, to fast digital control for an integrated voltage regulator.

BACKGROUND

Voltage converters such as switching converters are used to provide an output voltage at a target level depending on the specific requirements of the electronic device the voltage converter is coupled to. Voltage converters come in the form of buck converters which are configured to reduce the output voltage compared to an input, boost converters which are configured to increase the output voltage and buck-boost converters which are configured to be able to either decrease or increase the output voltage.

Voltage converters can be controlled through a digital controller where the control loop is implemented using an analog-to-digital converter (ADC) at the front end to digitise the output voltage information. ADCs require a lot of power and have a highly complex structure. They are required to sample the output voltage at a rate which is faster than the switching frequency of the voltage converter. For digitally controlled voltage inverters with very high switching speeds, such as integrated voltage regulators (IVRs), a redesign of the ADC is required in order to achieve the high sampling rates needed in order for the IVR to stay stable. However, such a redesign of the most complex part of the IVR is expensive and costly.

It is an object of the disclosure to address one or more of the above problems.

SUMMARY

According to a first aspect of the disclosure there is provided a voltage converter configured to provide an output voltage, the voltage converter comprising: a first device, configured to measure an absolute voltage with respect to a reference voltage; and a second device, configured measure a relative voltage with respect to the absolute voltage; such that the output voltage is regulated using the measurements of the absolute voltage and the relative voltage.

Optionally, the voltage converter is one of a buck converter, a boost converter, a buck-boost converter or an integrated voltage regulator.

Optionally, the first device is configured to measure the absolute voltage at a first sampling rate.

Optionally, the first sampling rate is a pre-determined rate.

Optionally, the absolute voltage is the instantaneous output voltage sampled at the first sampling rate with respect to the reference voltage.

Optionally, the reference voltage is a ground voltage.

Optionally, the absolute voltage is compared to a target output voltage for the voltage converter.

Optionally, the first device comprises an analog-to-digital controller coupled to a clock counter, such that the clock counter sets the first sampling rate.

Optionally, the second device comprises: a sample-and-hold circuit coupled to the clock counter; and a comparison circuit.

Optionally, wherein the sample-and-hold circuit is configured to measure the absolute voltage at the first sampling rate.

Optionally, the sample-and-hold circuit comprises a resistor coupled to a capacitor.

Optionally, the comparison circuit is configured to measure a relative voltage at a second sampling rate.

Optionally, the second sampling rate is faster than the first sampling rate.

Optionally, the second sampling rate is a pre-determined rate.

Optionally, the relative voltage is a measurement of the instantaneous output voltage sampled at the second sampling rate.

Optionally, the comparison circuit is further configured to compare the absolute voltage to the relative voltage to generate an offset signal.

Optionally, the comparison circuit comprises a plurality of comparators, each comparator configured to activate when the offset voltage exceeds a given threshold.

According to a second aspect of the disclosure, there is provided a method of regulating an output voltage of a voltage converter comprising a high side switch, the method comprising: measuring an absolute voltage at a first sampling rate; comparing the absolute voltage to a reference voltage to generate a first error voltage; measuring a relative voltage at a second sampling rate, the second sampling rate being faster than the first sampling rate; comparing the relative voltage to an absolute voltage to generate a second error voltage; and generating a control signal configured to regulate the output voltage of the voltage converter, such that the control signal is based on the first error voltage and the second error voltage.

Optionally, the absolute voltage is the output voltage averaged over the first sampling rate, the reference voltage is a target output voltage for the voltage converter and the relative voltage is the output voltage averaged over the second sampling rate.

Optionally, the high side switch has an adjustable on-time such that the control signal regulates the output voltage by adjusting the on-time of the high side switch.

It will be appreciated that the method of the second aspect may include using and/or providing features as set out in the first aspect and can incorporate other features as described herein.

DETAILED DESCRIPTION

Digital control for voltage regulators, such as switching regulators, can offer benefits when compared to traditional analog control. The digital control can offer a greater degree of programmability and flexibility when compared to an analog controller, and can also offer a greater degree of visibility with digital telemetry offering the ability to monitor voltages and currents.

Figure 1:
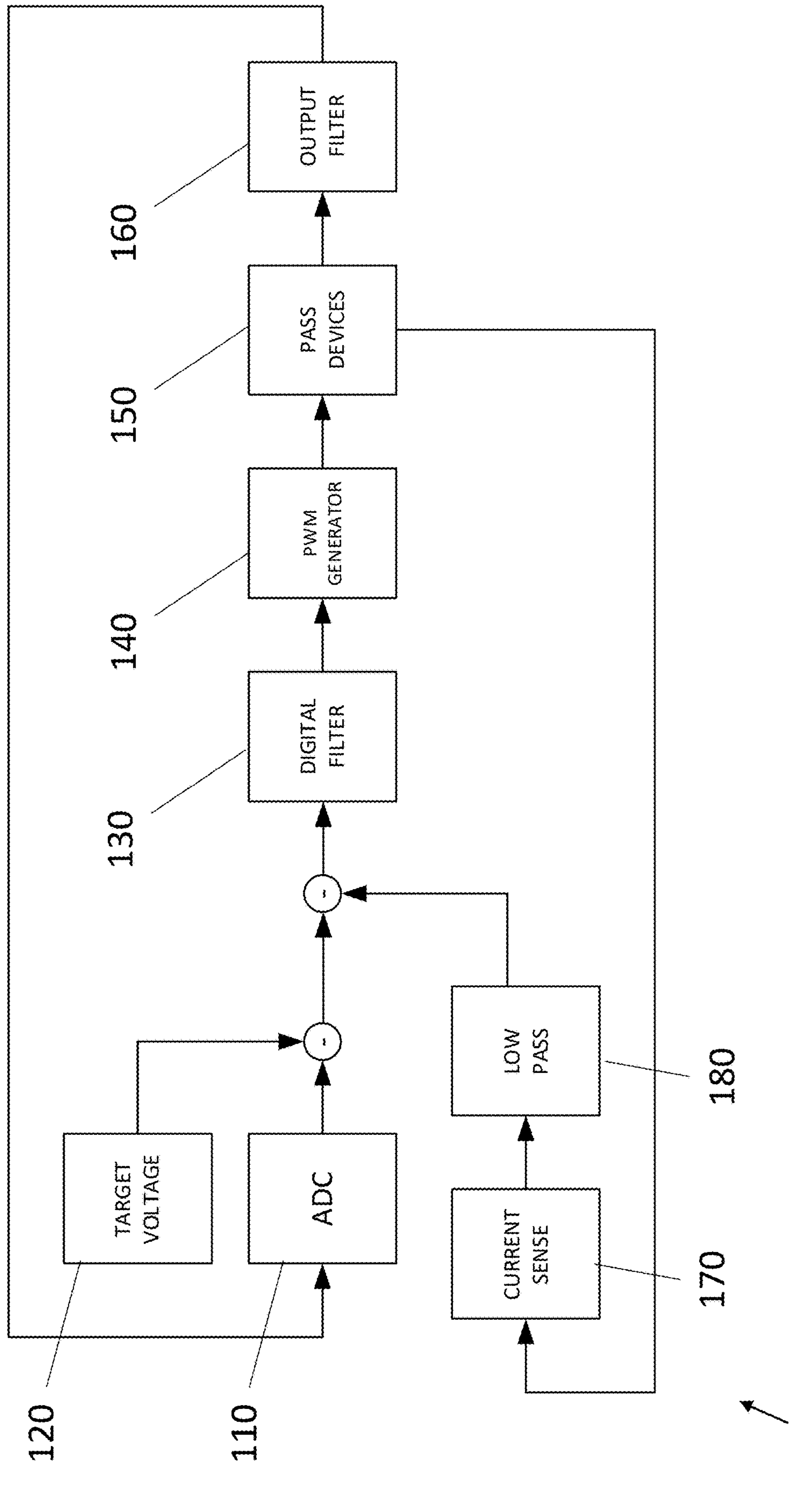
FIGURE. 1 (Prior Art)
FIG. 1 is a diagram of a digitally controlled voltage converter comprising an analog-to-digital converter (ADC) of the prior art.

FIG. 1 shows a digitally controlled voltage converter 100 of the prior art. The digitally controlled voltage converter 100 comprises an analog-to-digital converter (ADC) 110, a target voltage comparator 120, a digital filter 130, a PWM generator 140, pass devices 150 and an output filter 160. The output filter 160 comprises an inductor and an output capacitor. The voltage converter 100 further comprises a current sense device 170 which is configured to sense the current from the pass devices 150 and a low pass device 180. The pass devices 150 can comprise a plurality of switches and the corresponding drivers/logics for the plurality of switches. The voltage converter 100 also comprises a clock CLK which is not included in the figure.

The ADC 110 is configured to sample an output voltage $V_{out}$ generated by the voltage converter 100 via the output filter 160. The sampling of the output voltage occurs at a set sampling rate. This sampling rate must be at least equal to the switching frequency of the voltage converter 100. The clock CLK is coupled to the ADC 110 and sets the sampling rate for the ADC 110. Digitally controlled voltage converter 100 uses an ADC 110 at the front-end to digitise the sensed output voltage (feedback voltage). This allows the voltage converter 100 to know the instantaneous state of the output voltage, which is needed to implement a control loop. The digital control scheme then compares the actual output voltage $V_{out}$ of the to the target output voltage $V_{target}$ 120 and generates a value which can be used to control the duty cycle of the pass-devices 150.

Several control schemes can be implemented, but they can be broadly categorised as either voltage-mode, or current-mode control. The digitally controlled voltage converter 100 uses a current-mode control scheme. In the current-mode control scheme, the output voltage $V_{out}$ is compared to the target voltage $V_{target}$ and the value generated by this comparison is the error voltage ERR. The error voltage ERR is proportional to the difference in the output current $I_{out}$ that the controller would like the regulator to generate and the target output current $I_{target}$. The voltage converter 100 then measures the actual output current $I_{out}$ and compares this to the target output current $I_{target}$, and generates a current error signal $I_{err}$. The current comparison can be done in a number of ways, such as peak-current control or valley-current control. These schemes are well established and well described in literature. In the voltage converter 100, an average-current control loop is implemented. In an average-current control loop, the sensed instantaneous coil current 170 is averaged over several cycles and this average current $I_{average}$ is compared to the target output current value $I_{target}$. The current error signal $I_{err}$ is then used to set the value of the duty cycle for the switching voltage converter 100. In the digital control scheme, the duty cycle is set directly by using a PWM generator 140 based on the current error value $I_{err}$. In alternative embodiments, a digitally controlled timer could be used instead of the PWM generator.

The digital control scheme of implementing the ADC 110 in the front end of the voltage converter 100 is an effective method of control. The sampling rate of the ADC 110 is set by a number of constraints. These include, but are not limited to a loop stability criteria, effective phase shifts caused by sampling delays, effects of limit cycling on the output voltage ripple. Therefore, the ADC 110 must sample the output voltage $V_{out}$ at a rate several times faster than the switching frequency of the voltage converter 100. In order for the voltage converter 100 to remain stable, the ADC 110 must sample at a rate at least twice as faster than the switching frequency. Therefore, the ADC 110 traditionally only operates efficiently at switching frequencies less than 4 MHz.

Figure 2:
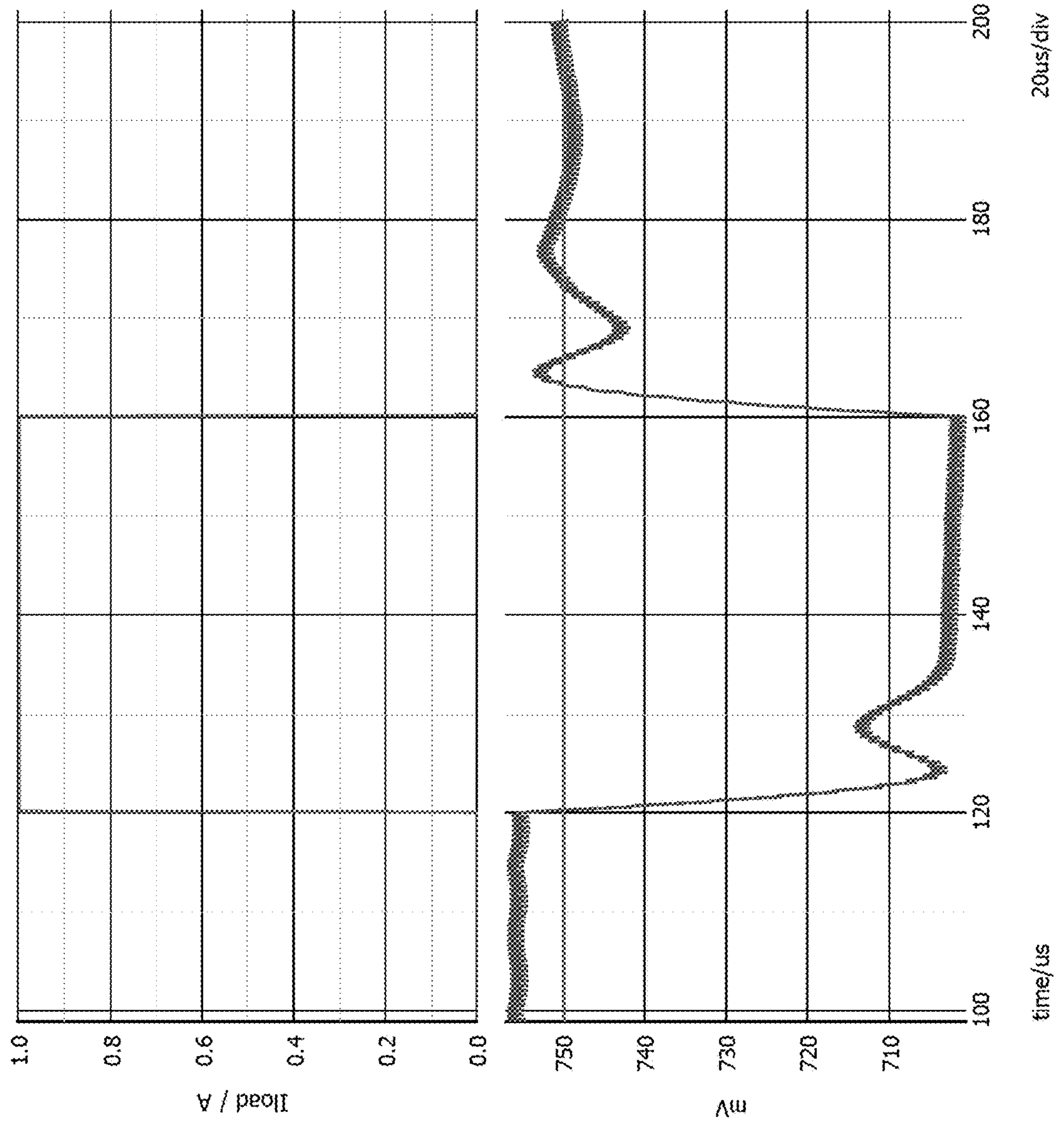
FIGURE. 2 (Prior Art)
FIG. 2 is a simulation of the voltage converter of the prior art with a 16 MHz sampling rate for the ADC and a switching frequency of 2 MHz.

FIG. 2 is a pair of plots from a simulation of voltage converter 100. In this simulation, the voltage converter 100 is acting like a buck converter and is regulating a 5V supply ($V_{in}$) to a 0.75V output ($V_{out}$) with a 1 A load pulse. The buck converter 100 is switching at a switching frequency of 2 MHz to drive a 470 nH inductor. The ADC of the buck converter 100 in this simulation is sampling at a sampling rate of 16 MHz.

The top plot 210 shows the value of the load current $I_{load}$ for the buck converter 100 as a function of time. At approximately 120 μs, the 1 A pulse is passed through the voltage converter 100. The pulse lasts approximately 40 μs. The bottom plot 220 shows the output voltage $V_{out}$ of the voltage converter as a function of time. As the 1 A pulse passes through the buck converter 100, the value of $V_{out}$ drops from approximately 0.75V to approximately 0.71V. As can be seen in plot 220, under this typical control scheme for a buck converter 100, the output voltage $V_{out}$ is fairly stable.

The implementation of a digital control scheme becomes more difficult when considering, for example, integrated voltage regulators (IVRs). IVRs are designed to be integrated inside a central processing unit (CPU) package close to the load. This means that the inductor of the IVR will also need to be integrated in this way. Such inductors that are suitable for this level of integration are limited to an inductance level less than 10 nH. For the IVR to effectively drive such an inductor of this value of inductance requires a high switching frequency. For example, values greater than 40 MHz. The output capacitor will also be integrated into the CPU and therefore will also have a small charge value of less than 400 nH. Therefore, the bandwidth of the regulator is also required to be high. For example, values greater than 5 MHz. Hence the digital control loop for an IVR would need to sample the output voltage $V_{out}$ at a rate much higher than 4 MHz. For example, the sampling rate might need to be as fast as ten times greater than the existing schemes in the art. This requires a large and complex ADC which consumes a lot of power when in operation.

Figure 3:
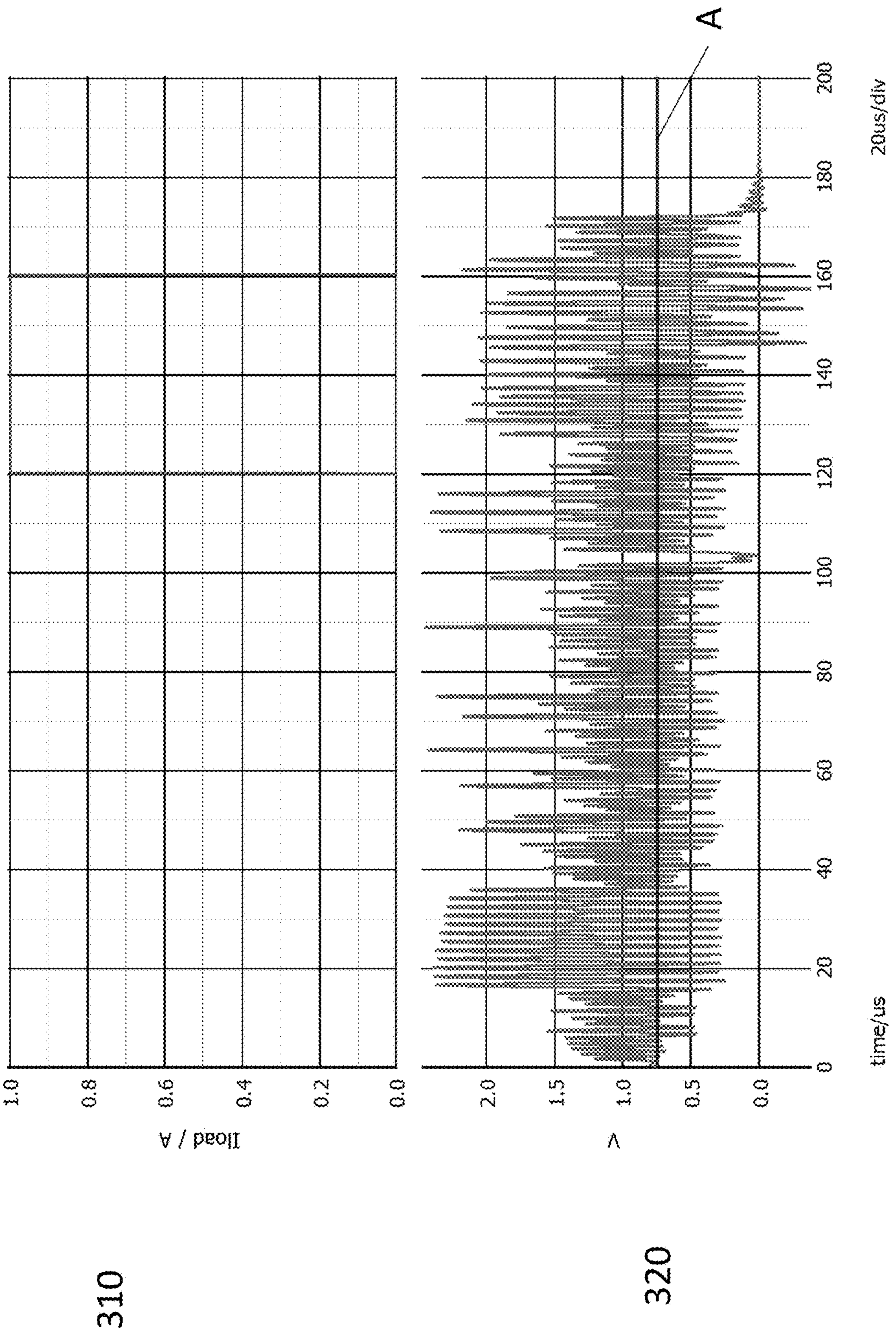
FIGURE. 3 (Prior Art)
FIG. 3 is a simulation of the voltage converter of the prior art with a 16 MHz sampling rate for the ADC and a switching frequency of 20 MHz.

FIG. 3 is a pair of plots from a simulation of voltage converter 100. In this simulation, the voltage converter 100 was implemented as a buck converter. The conditions applied to the simulation were such as to mimic the conditions for an IVR. The buck converter 100 of the simulation is operating at a switching frequency of 20 MHz to drive a 47 nH inductor. The output capacitor in the simulation is set to a twentieth of the value of the simulation in FIG. 2 in order to increase the bandwidth of the buck converter 100 to mimic the IVR. The ADC in this simulation is sampling at a sampling rate of 4 MHz for an IVR switching at a 20 MHz rate. This sets the same limitations as for an ADC sampling at 16 MHz for an IVR switching at 100 MHz.

The top plot 310 shows the value of the load current $I_{load}$ for the buck converter 100 as a function of time. At approximately 120 μs, the 1 A pulse is passed through the voltage converter 100. The pulse lasts approximately 40 μs. The bottom plot 320 shows the output voltage $V_{out}$ of the voltage converter 100 as a function of time. The horizontal line A shown on the bottom plot indicates the target output voltage $V_{target}$ of 0.75V. The output voltage $V_{out}$ of the buck converter 100 is highly unstable under the simulated IVR conditions.

Therefore, the digital control schemes known in the art are unsuitable for high switching frequency voltage converters such as IVRs.

Figure 4:
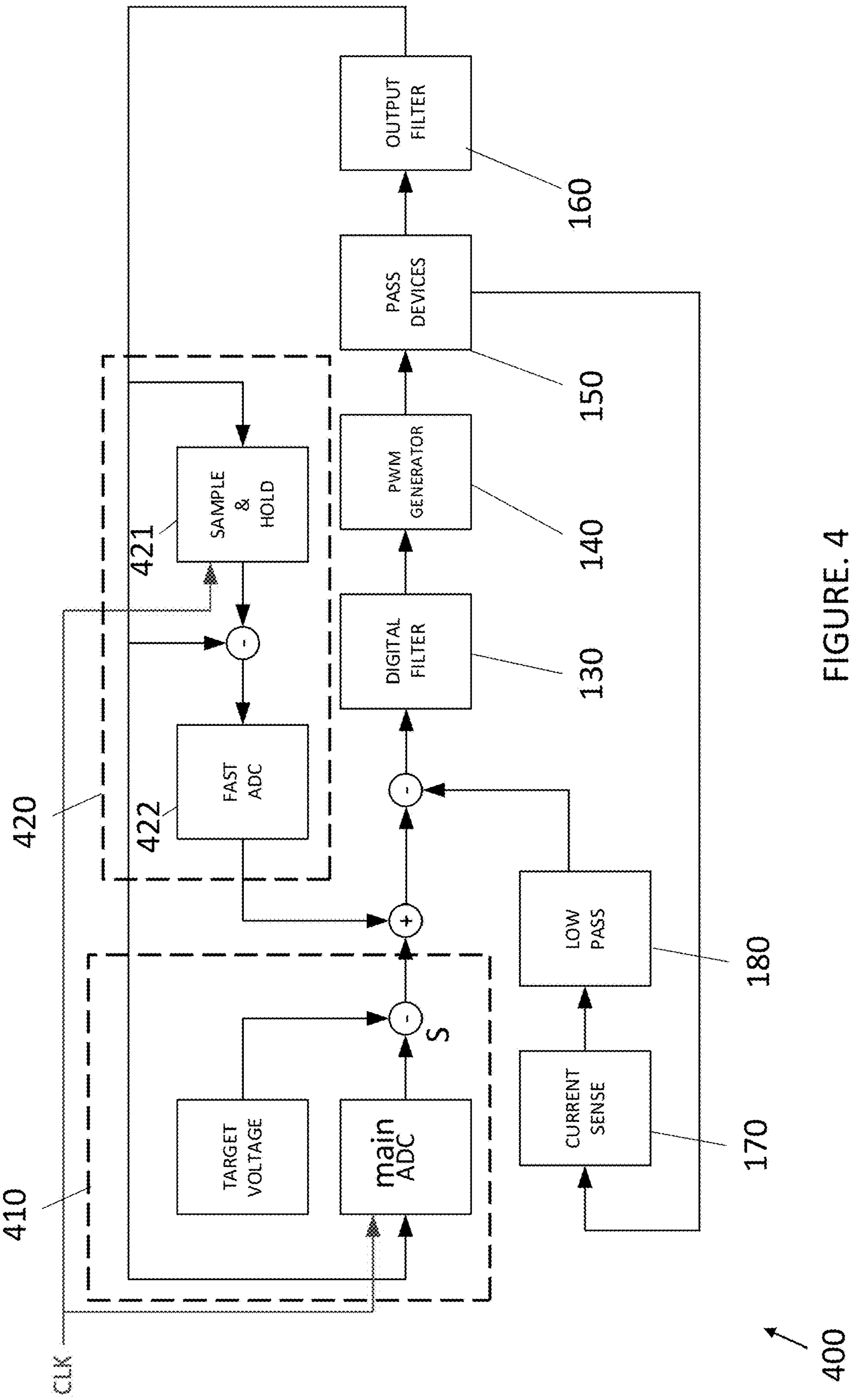
FIG. 4 is a diagram of a voltage converter comprising a first device and a second device of the present disclosure.

FIG. 4 is a diagram of a voltage converter 400 configured to provide an output voltage $V_{out}$ of the present disclosure. The voltage converter 400 could be a buck converter, a boost converter, a buck-boost converter or an integrated voltage regulator. The voltage converter 400 comprises a first device 410, configured to measure an absolute voltage with respect to a reference voltage, and a second device 420, configured to measure a relative voltage with respect to the absolute voltage. The voltage converter 400 is similar to the voltage converter 100 except with the addition of features 410 and 420, therefore the same labelling has been kept for the voltage converter 400 and the components are taken to have the same functionality and meaning as for the voltage converter 100. The voltage converter 400 in this embodiment is configured to operate under a current-mode control scheme using an average-current control loop. However, the voltage converter 400 could also be operated under any other current-mode control schemes or a voltage-mode control scheme. The control loop of the voltage converter 400 is taken to comprise the following components: digital filter 130, PWM generator 140, pass devices 150, output filter 160, current sense 170, low pass 180, the first device 410 and the second device 420. It is understood that in alternative embodiments then control loop could comprise more components than this or less components.

The first device 410 is configured to measure the absolute voltage at a first sampling rate, wherein the first sampling rate is a number of measurements per second. The first sampling rate is a pre-determined rate which is regulated by the clock counter CLK. The first device 410 comprises an analog-to-digital controller (ADC) coupled to the clock counter CLK which sets the first sampling rate. The ADC of the first device 410 can also be referred to as the main ADC and is the same as the one implemented in voltage converter 100. The main ADC in the first device 410 samples the absolute voltage. The main ADC measures the absolute voltage with respect to the reference voltage. For example, the reference voltage could be ground. This measurement is then passed onto a combiner S. The combiner S compares the measured absolute voltage to a target output voltage for the voltage converter 400 to produce a first control signal. The control signal is passed onto the PWM generator 140 and is configured to control the duty cycle of the switches in the pass devices 150. The absolute voltage measured by the first device 410 is the instantaneous output voltage $V_{out}$ of the voltage converter 400 at the sampling time of the first sampling rate. The reference voltage is the target output voltage for the voltage converter 400. In the digital embodiment shown in FIG. 4, the reference voltage is a piece of digital code. For example, the target output voltage could be 0.75V.

The second device 420 comprises a sample-and-hold circuit 421 coupled to the clock counter CLK and a comparison circuit 422. In the example embodiment of the voltage converter 400, the comparison circuit 422 is a fast ADC. The sample-and-hold circuit 421 is configured to measure the absolute voltage of the voltage converter 400 at the first sampling rate. In other words, the sample-and-hold circuit 421 of the second device 420 measures the absolute voltage at the same sampling rate as the ADC of first device 410. The main ADC of the first device 410 and the sample-and-hold circuit 421 of the second device 420 are both coupled to the clock counter CLK and therefore both measure the absolute voltage at the same instances. Once the sample-and-hold circuit 421 has sampled the absolute voltage, it is passed onto the comparison circuit 422. The comparison circuit 422 is configured to measure the relative voltage a second sampling rate, wherein the second sampling rate is a number of measurements per second. The second sampling rate is faster than the first sampling rate. The second sampling rate is also a pre-determined rate. The relative voltage is the instantaneous output voltage $V_{out}$ of the voltage converter 400 measured at the sampling times of the second sampling rate. These sampling times, and hence the measurements of the relative voltage occur more frequently than the measurements of the absolute voltage. The comparison circuit 422 is further configured to compare the relative voltage to the absolute voltage stored by the sample-and-hold circuit 421 to generate an offset signal.

The offset signal from the second device 420 can be added to the main control loop in a number of places. It can be added to the output of the main ADC before the current comparison as shown in the embodiment of voltage converter 400. In this embodiment, the first device 410 and the second device 420 act as a single system to mimic a single ADC with high sampling rate. In alternative embodiments, the offset signal from the second device 420 can be added after the current comparison, directly before the PWM generator. This then adds an element of pure voltage-mode control into the loop.

Figure 5:
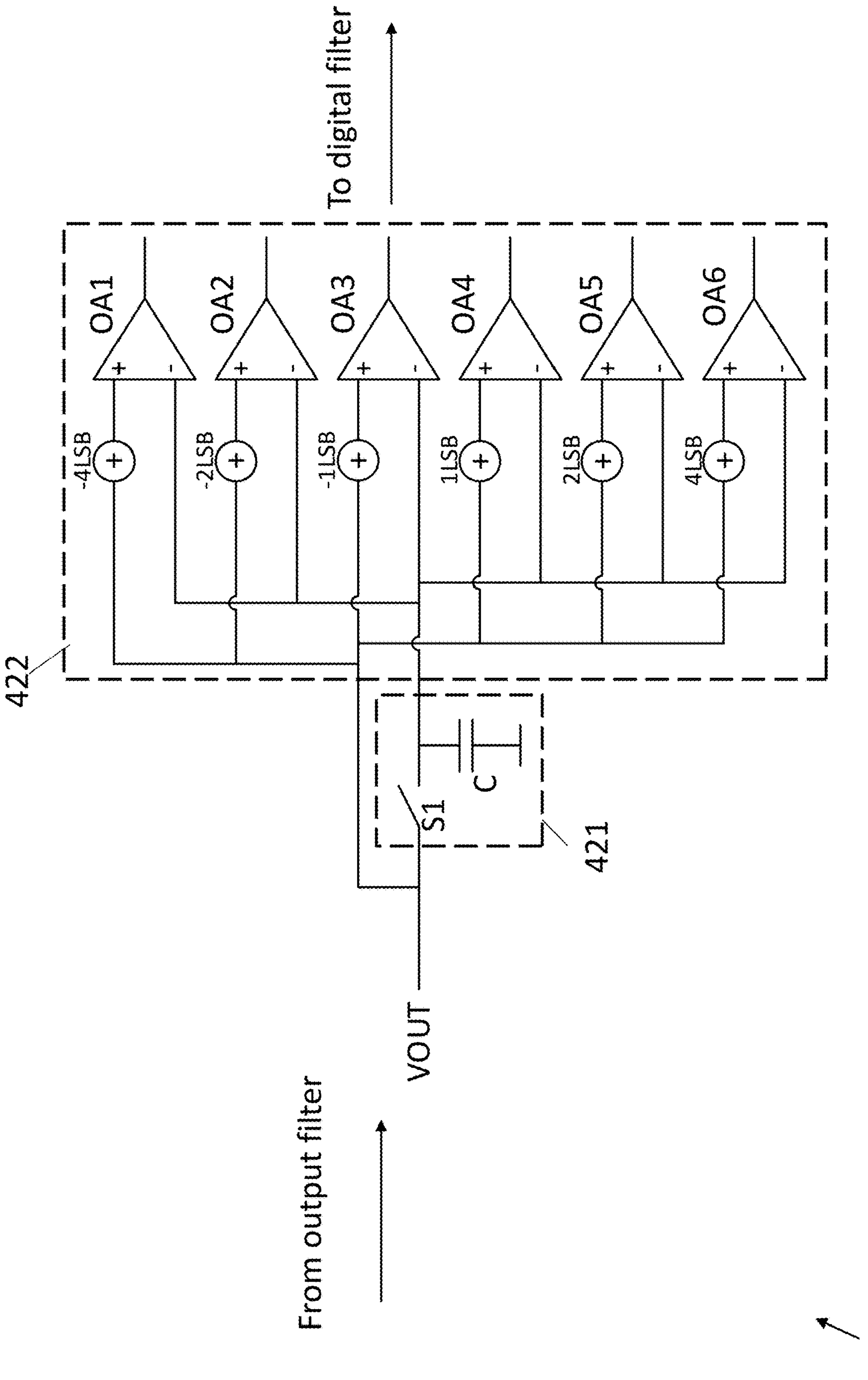
FIG. 5 is an example embodiment of the second device.

FIG. 5 is an example embodiment of the second device 420. In this example embodiment of the second device 420, the comparison circuit 422 is a fast ADC.

The sample-and-hold circuit 421 in this example embodiment comprises a switch S1 and a capacitor C. When the sample-and-hold circuit 421 receives the signal from CLK to commence measurement of the absolute voltage, the switch S1 closes and the capacitor C is charged to the absolute voltage. The switch S1 is then opened and the capacitor stores the absolute voltage. The flash ADC 422 then compares the absolute voltage stored on capacitor C to the relative voltage being measured at the second sampling rate to generate the offset signal. The flash ADC 422 in this embodiment comprises a plurality of comparators. In this example embodiment, the flash ADC 422 comprises six comparators: OA1, OA2, OA3, OA4, OA5 and OA6. Each comparator in the plurality of comparators is configured to activate when the comparison between the absolute voltage and the relative voltage exceeds a certain threshold value. In the example embodiment shown here, OA1 is activated when the relative voltage drops below −4 LSB (least significant bits) less than the absolute voltage. In other words, if the relative voltage has a value which is more than 4 LSB less than the stored absolute voltage on the sample-and-hold circuit 421 then OA1 is activated. The comparators OA2 and OA3 are activated when the relative voltage drops below −2 LSB and −1 LSB respectively, when compared to the absolute voltage. The comparator OA4 is activated when the relative voltage exceeds 1 LSB, when compared to the absolute voltage. In other words, if the relative voltage has a value which is more than 1 LSB greater than the absolute voltage stored on the sample-and-hold circuit 421 then OA4 is activated. The comparators OA5 and OA6 are activated when the relative voltage exceeds 2 LSB and 4 LSB respectively, compared to the absolute voltage. The offset signal is generated to feed the information on the comparison between the relative voltage and the absolute voltage back into the control loop for the voltage converter 400. For example, if the relative voltage drops by 3 mV in comparison to the absolute voltage then comparators OA2 and OA3 would be activated and the control would receive a signal comprising this information. It is understood that in other embodiments the number of comparators and their activation thresholds will be different. The number of comparators and their activation thresholds are chosen in relation to the target output voltage of the voltage converter 400. Voltage converters 400 are designed in such a way to have a cap on their output voltage at maximum load to the voltage converter. Therefore, there is a pre-defined range within which the output voltage can fluctuate:

$$\Delta V_{out} = \frac{I_{load}\Delta t}{C_{out}} \quad (1)$$

where $I_{load}$ is the load current of the voltage converter 400, $C_{out}$ is the capacitance of the output capacitor and Δt is the time between samples at the first sampling rate. Therefore, the offset voltage calculated by the fast ADC 422 will fall within the range defined by equation 1.

The voltage converter 400 comprising a first device 410 and a second device 420 is suitable for operating at switching frequencies approximately equal to 100 MHz with a bandwidth of approximately 10 MHz, but using an ADC in the first device 410 that is no more complex than the existing designs and switching at approximately the same rate as for the comparator 100.

In order to be stable, the control loop must have information about the state of the output voltage $V_{out}$ at a rate faster than at least twice the bandwidth of the control loop and preferably faster than the switching frequency of the voltage converter 400. It is not necessary for the main ADC to provide this information. Instead, in the voltage converter 400 of the present disclosure the functions of the main ADC is split into two parts. The first is a slow, high accuracy measurement that can be used to control the DC level of the output voltage which is taken at the first sampling rate. The second is a fast measurement that has relatively low accuracy and only measures the AC part of the output voltage, taken at the second sampling rate.

The slow measurement has all the same requirements as the voltage measurement in the traditional digital controller—the accuracy is important as it sets the DC level of the buck output which directly determines the accuracy spec of the regulator. The main ADC must have wide output range to encompass the whole programmable range of the voltage converter's 400 output and any over- or under-shoot of the output voltage $V_{out}$. The slower measurement at the first sampling rate must also have fine resolution to ensure the output voltage $V_{out}$ can be controlled with the required precision. These criteria ensure that the main ADC is large and complex, and so there is substantial benefit to having a lower sampling rate. This slow measurement is performed by the first device 410 and the sample-and-hold circuit 421 of the second device 420.

The fast measurement then provides a measure of how much the output voltage $V_{out}$ has changed since the last slow measurement done by the main ADC. So the main ADC samples the output voltage $V_{out}$ at the first sampling rate, and then between "slow" samples the fast ADC 422 tracks how much the output voltage $V_{out}$ has changed since that last sample. The fast measurement, performed at the second sampling rate, does not measure the absolute value of the output voltage—it only measures the change in output voltage. The fast ADC 421 does not need high accuracy as the accuracy of the fast ADC 421 does not directly affect the DC accuracy of the voltage converter 400. The fast ADC 421 does not require a wide output range—it is only expected to measure the difference between the output voltage between main ADC samples—so it can have a much lower number of bits than the main ADC. The required range of the fast ADC 421 is given by equation 1 above. The fast ADC 421 is therefore relatively small and has low complexity, and can be operated at high sample rates with acceptable power consumption.

Figure 6:
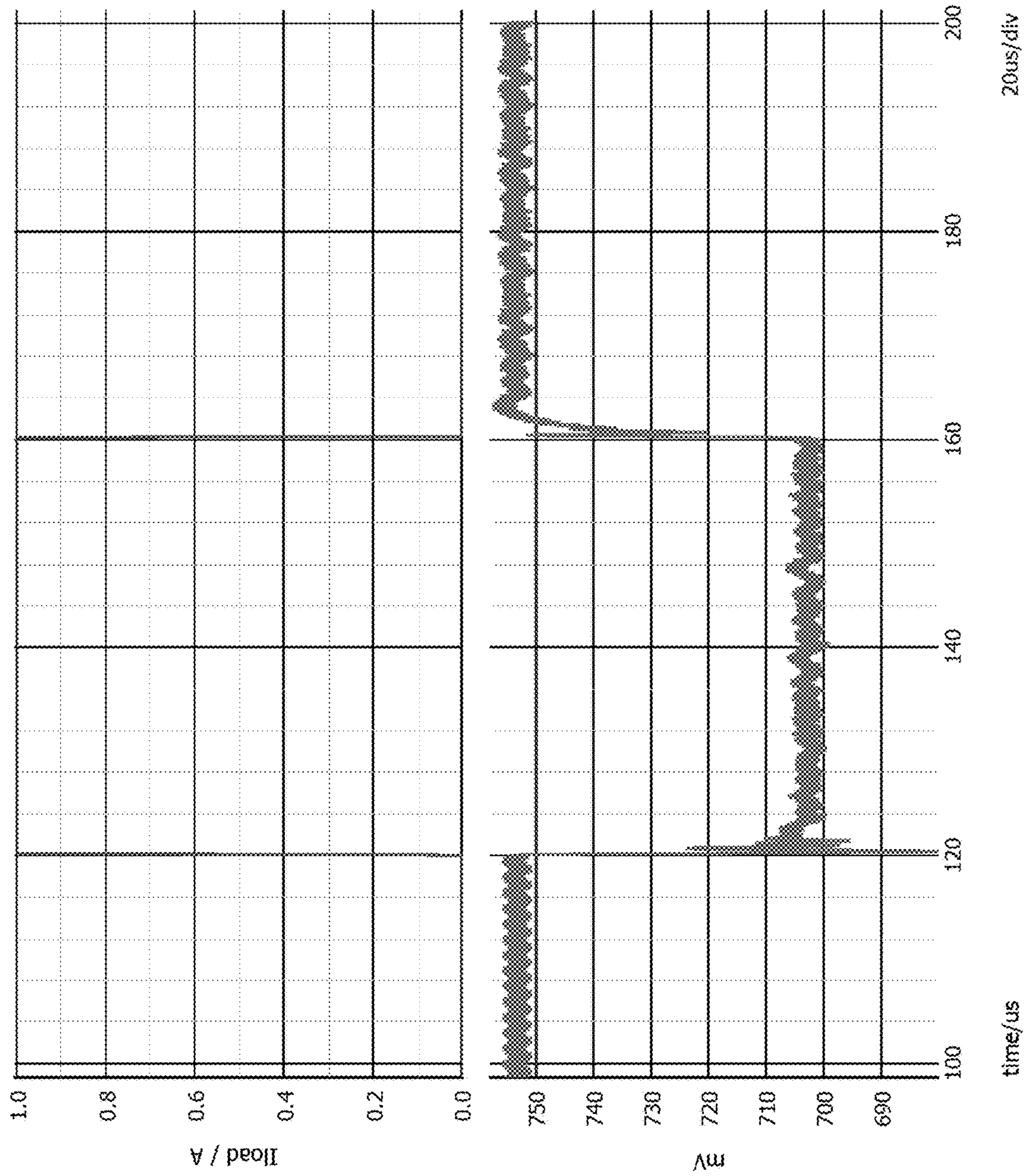
FIG. 6 is a simulation of the voltage converter of the present disclosure with a first sampling rate of 16 MHz, a second sampling rate of 80 MHz and a switching frequency of 20 MHz.

FIG. 6 is a pair of plots from a simulation of voltage converter 400. In this simulation, the scheme as described in this disclosure was implemented into the simulation that was run to produce FIG. 3. The simulation for FIG. 6 includes a fast ADC sampling at a sampling rate 80 Mhz, with 4-bits, which only measures the difference between the sample-and-hold output at the instant the main ADC sampled the output voltage, and the output voltage at the subsequent fast-ADC sampling times.

The top plot 610 shows the value of the load current $I_{load}$ for the voltage converter 400 as a function of time. At approximately 120 μs, the 1 A pulse is passed through the voltage converter 400. The pulse lasts approximately 40 μs. The bottom plot 620 shows the output voltage $V_{out}$ of the voltage converter 400 as a function of time. The voltage converter 400 which is mimicking an IVR in this simulation has now been stabilized and operates correctly. Noise on this simulation is from a combination of numerical errors in the simulator (simulator error) and also from the model, which has not been optimized for this frequency and operating condition.

Figure 7:
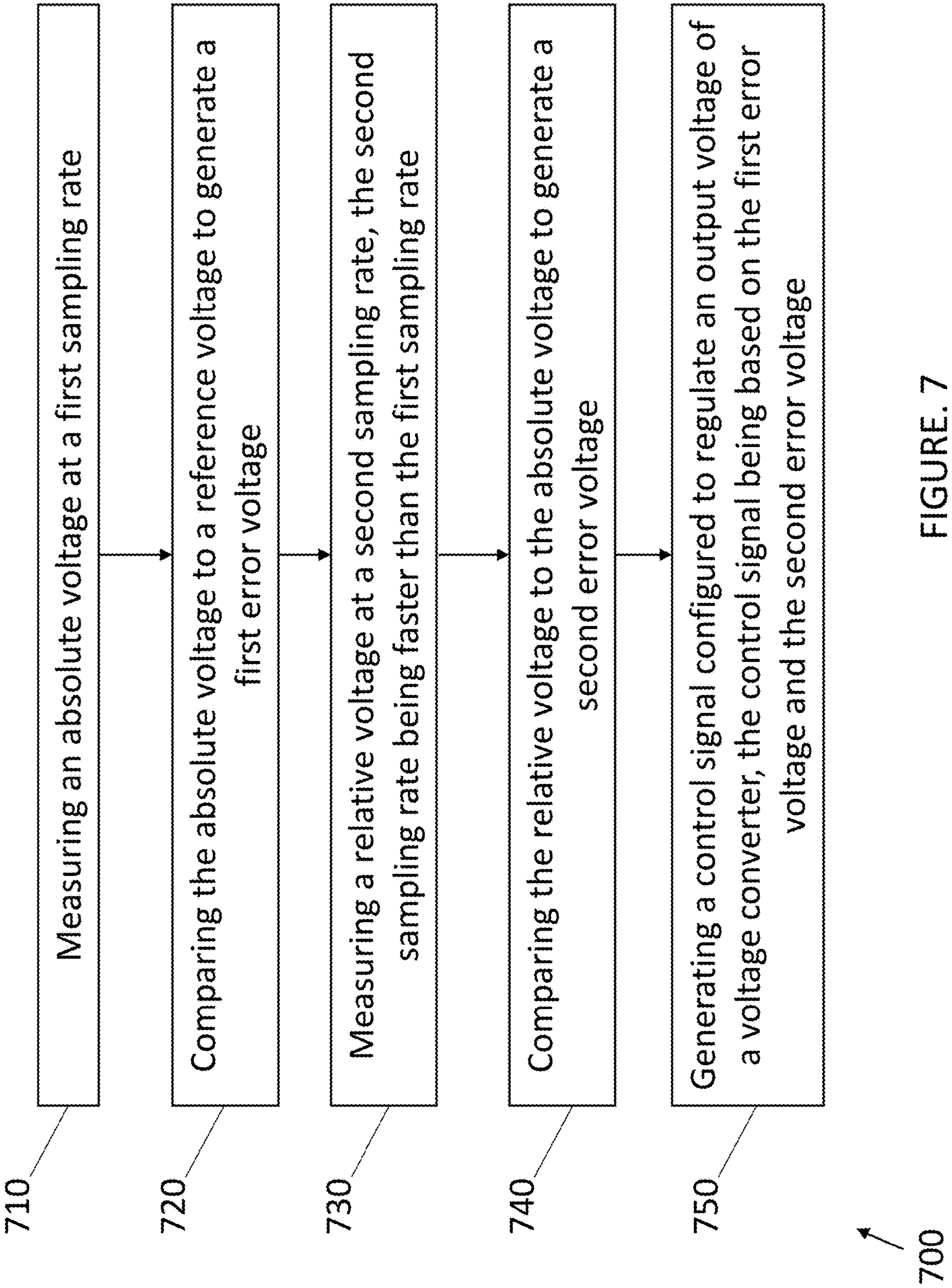
FIG. 7 is a flow chart of a method of regulating an output voltage of a voltage converter according to the present disclosure.

FIG. 7 is a flow chart of a method 700 of regulating an output voltage $V_{out}$ of a voltage converter according to the present disclosure. The voltage converter comprises a high side switch. The high side switch has an adjustable on-time. The voltage converter to which method 700 applies is the voltage converter 400 of FIG. 4. This voltage converter could be one of a buck converter, a boost converter, a buck-boost converter or an integrated voltage regulator.

At step 710, an absolute voltage is measured at a first sampling rate. The absolute voltage is then compared to a reference voltage at step 720 to generate a first error voltage. The absolute voltage is the output voltage $V_{out}$ averaged over the first sampling rate and the reference voltage is a target output voltage for the voltage converter. This target output voltage is the target voltage for the voltage converter to generate and the method 700 is regulating the output voltage $V_{out}$ to match this target output voltage. Steps 710 and 720 are implemented using the first device 410 of voltage converter 400.

Then at step 730, a relative voltage is measured at a second sampling rate, the second sampling rate being faster than the first sampling rate. The relative voltage is then compared to the absolute voltage at step 740 to generate a second error voltage. The relative voltage is the output voltage $V_{out}$ averaged over the second sampling rate. Steps 730 and 740 are implemented using the second device 420 of voltage converter 400.

Finally, in step 750, a control signal is generated. The control signal is configured to regulate the output voltage $V_{out}$ of the voltage converter. The control signal is based on the first error voltage and the second error voltage. The control signal regulates the output voltage by adjusting the on-time of the high side switch. Step 750 is implemented through the control loop of voltage converter 400.

The use of a simple main ADC sampling at a first sampling rate which is much lower than would typically be used in a traditional digital control loop for a fast switching regulator combined with the use of a sample-and-hold circuit to sample the output voltage at the same times when the main ADC samples. The sample-and-hold circuit 421 is coupled to a comparator circuit 422 or fast ADC 422 which is configured to detect whether the output voltage has changed in the time between main ADC samples. This fast ADC 422 is operated at a second sampling rate which is much faster than the first sampling rate of the main ADC. The use of the fast ADC 422 provides high frequency feedback into the control loop. This fast ADC 422 is likely to have a much reduced number of bits to ensure it simpler, smaller and lower-power than the main ADC. The inclusion of information from the fast ADC 422 into the digital control loop to provides high-frequency stability for the control loop.

Additional benefits of the voltage converter 400 of the present disclosure are lower power consumption, smaller die area and faster main ADC design.

The concepts in this disclosure can be applied equally to both voltage- and current-mode controlled voltage converters as well as buck converters, boost, converters buck-boost converters or integrated voltage regulators.

A skilled person will appreciate that variations of the disclosed arrangements are possible without departing from the disclosure. Accordingly, the above description of the specific embodiments is made by way of example only and not for the purposes of limitation. It will be clear to the skilled person that minor modifications may be made without significant changes to the operation described.

The invention claimed is:

1. A voltage converter configured to provide an output voltage, the voltage converter comprising:

a first device, configured to measure an absolute voltage with respect to a reference voltage to generate a first error voltage, the absolute voltage being measured at a first sampling rate; and a second device, configured to measure a relative voltage with respect to the absolute voltage to generate a second error voltage, the relative voltage being measured at a second sampling rate, the second sampling rate being faster than the first sampling rate;

whereby the output voltage is regulated using a control signal based on the first error voltage and the second error voltage.

2. The voltage converter of claim 1, wherein the voltage converter is one of a buck converter, a boost converter, a buck-boost converter or an integrated voltage regulator.

3. The voltage converter of claim 1, wherein the first sampling rate is a pre-determined rate.

4. The voltage converter of claim 1, wherein the absolute voltage is the instantaneous output voltage sampled at the first sampling rate with respect to the reference voltage.

5. The voltage converter of claim 4, wherein the reference voltage is a ground voltage.

6. The voltage converter of claim 4, wherein the absolute voltage is compared to a target output voltage for the voltage converter.

7. The voltage converter of claim 6, wherein the first device comprises an analog-to-digital controller coupled to a clock counter, such that the clock counter sets the first sampling rate.

8. The voltage converter of claim 7, wherein the second device comprises:

a sample-and-hold circuit coupled to the clock counter; and a comparison circuit.

9. The voltage converter of claim 8, wherein the sample-and-hold circuit is configured to measure the absolute voltage at the first sampling rate.

10. The voltage converter of claim 9, wherein the sample-and-hold circuit comprises a resistor coupled to a capacitor.

11. The voltage converter of claim 9, wherein the second sampling rate is a pre-determined rate.

12. The voltage converter of claim 9, wherein the relative voltage is a measurement of the instantaneous output voltage sampled at the second sampling rate.

13. The voltage converter of claim 12, wherein the comparison circuit is further configured to compare the absolute voltage to the relative voltage to generate an offset signal.

14. The voltage converter of claim 13, wherein the comparison circuit comprises a plurality of comparators, each comparator configured to activate when the offset signal exceeds a given threshold.

15. A method of regulating an output voltage of a voltage converter comprising a high side switch, the method comprising:

measuring an absolute voltage at a first sampling rate;

comparing the absolute voltage to a reference voltage to generate a first error voltage;

measuring a relative voltage at a second sampling rate, the second sampling rate being faster than the first sampling rate;

comparing the relative voltage to the absolute voltage to generate a second error voltage; and generating a control signal configured to regulate the output voltage of the voltage converter, such that the control signal is based on the first error voltage and the second error voltage.

16. The method of claim 15, wherein the absolute voltage is the output voltage averaged over the first sampling rate, the reference voltage is a target output voltage for the voltage converter and the relative voltage is the output voltage averaged over the second sampling rate.

17. The method of claim 16, wherein the high side switch has an adjustable on-time such that the control signal regulates the output voltage by adjusting the on-time of the high side switch.

* * * * *